(12) United States Patent
Fischer et al.

(10) Patent No.: US 7,478,882 B2
(45) Date of Patent: Jan. 20, 2009

(54) MOTOR VEHICLE SEAT

(75) Inventors: Matthias Fischer, Kronach (DE);
Jochen Hofmann, Marktgraitz (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 287 days.

(21) Appl. No.: 10/552,171

(22) PCT Filed: Mar. 12, 2004

(86) PCT No.: PCT/DE2004/000560

§ 371 (c)(1),
(2), (4) Date: Oct. 5, 2005

(87) PCT Pub. No.: WO2004/091963

PCT Pub. Date: Oct. 28, 2004

(65) Prior Publication Data

US 2006/0145524 A1    Jul. 6, 2006

(30) Foreign Application Priority Data

Apr. 10, 2003    (DE) .................................. 103 17 238

(51) Int. Cl.
*B60N 2/20* (2006.01)
(52) U.S. Cl. .................................. 297/378.12; 297/340
(58) Field of Classification Search ............ 297/378.12, 297/341, 340, 321
See application file for complete search history.

(56) References Cited

U.S. PATENT DOCUMENTS

| | | | |
|---|---|---|---|
| 4,131,316 A | 12/1978 | Pallant et al. | |
| 4,269,446 A | 5/1981 | Gersmann et al. | |
| 4,368,916 A * | 1/1983 | Blasin | 297/341 |
| 4,743,066 A | 5/1988 | Boisset et al. | |
| 6,152,533 A * | 11/2000 | Smuk | 297/341 |
| 6,336,679 B1 * | 1/2002 | Smuk | 297/378.12 |

(Continued)

FOREIGN PATENT DOCUMENTS

DE    27 29 639 A1    1/1978

(Continued)

OTHER PUBLICATIONS

International Search Report, dated Aug. 19, 2004, corresponding to PCT/DE2004/00560.

*Primary Examiner*—David Dunn
*Assistant Examiner*—Tania Abraham
(74) *Attorney, Agent, or Firm*—Christie, Parker & Hale, LLP

(57) ABSTRACT

The invention relates to a motor vehicle seat comprising a backrest which can be moved from at least one position of use wherein it protects the back of the passenger, to a seating surface of the motor vehicle seat, an upholstery carrier which receives the seat upholstery which defines the seating surface and the place where the passenger can sit, and a coupling element which enables the backrest to be coupled to the upholstery carrier in such a manner that said support is displaced when the backrest is moved, especially lowered and/or displaced in the longitudinal direction of the seat. According to the invention, the coupling element is elastically mounted by means of an elastic element in such a manner that when the backrest is moved, the elastic element is initially deformed before the coupling element can act upon the upholstery carrier.

38 Claims, 5 Drawing Sheets

U.S. PATENT DOCUMENTS 6,382,718 B1    5/2002   Janke et al.
6,631,952 B1*  10/2003   Liebetrau et al. ............ 297/341
7,156,463 B2*   1/2007   Taubmann et al. ..... 297/378.12

FOREIGN PATENT DOCUMENTS

| | | |
|---|---|---|
| DE | 28 13 534 C2 | 10/1979 |
| DE | 198 60 234 C1 | 5/2000 |
| DE | 100 23 525 A1 | 11/2001 |
| DE | 100 34 510 A1 | 1/2002 |
| DE | 101 09 397 C1 | 10/2002 |
| DE | 102 46 473 A1 | 4/2004 |
| DE | 203 03 753 U1 | 8/2004 |
| DE | 203 04 713 U1 | 9/2004 |
| FR | 2 781 435 A1 | 1/2000 |
| FR | 2 800 021 A1 | 4/2001 |
| WO | WO 02/094605 A1 | 11/2002 |

\* cited by examiner

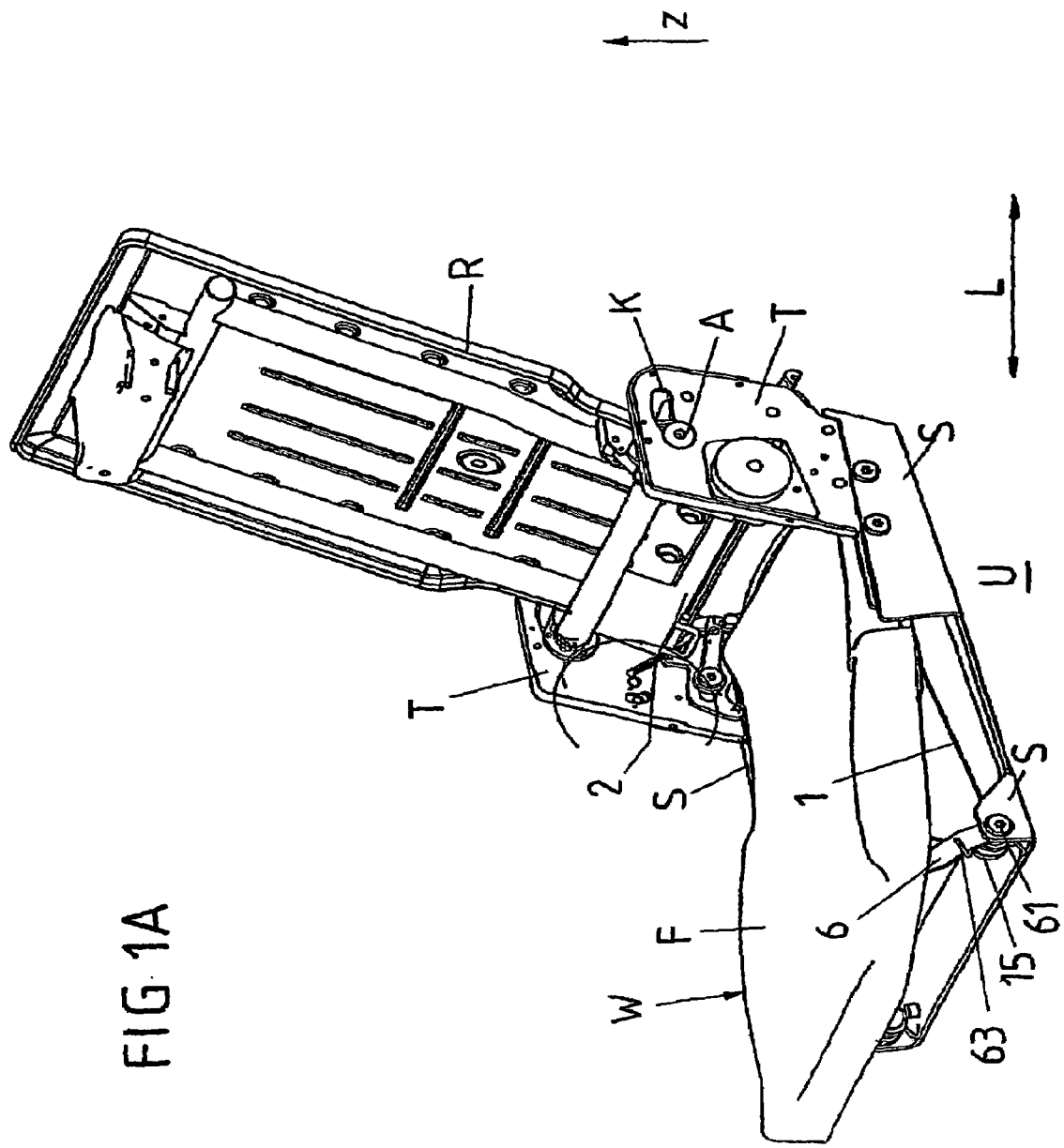

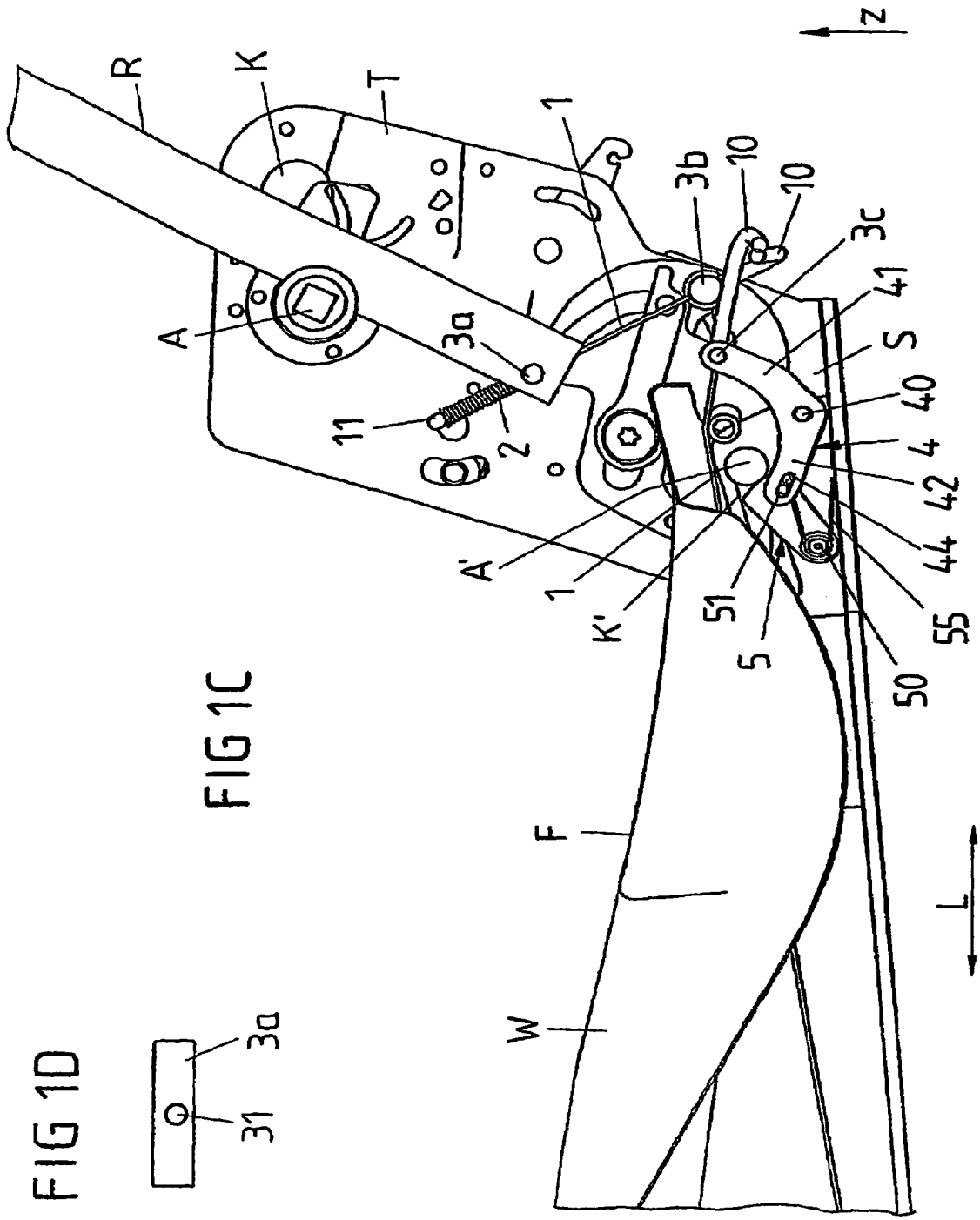

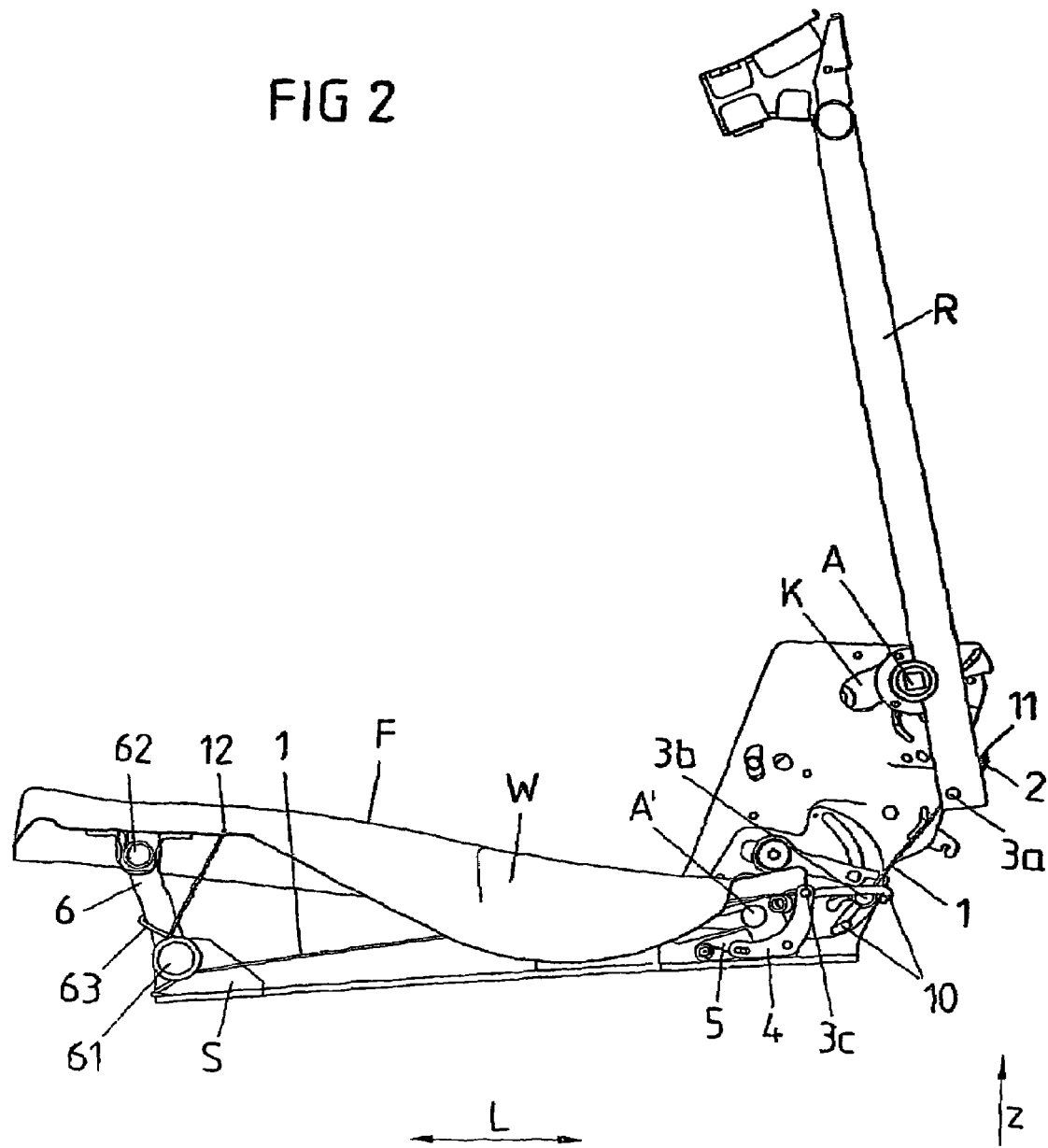

MOTOR VEHICLE SEAT

CROSS-REFERNCE TO RELATED APPICATION

This application is a National Phase Patent Application of International Application Number PCT/DE2004/000560, filed on Mar. 12, 2004, which claims the priority of German Patent Application Number 103 17 238.6, filed on Apr. 10, 2003.

BACKGROUND

The invention relates to a motor vehicle seat.

A motor vehicle seat of this kind comprises a backrest which can be folded forwards from at least one useful position in which it serves to support the back of a vehicle occupant by swivelling onto a seat surface of the seat underframe of the vehicle seat; an upholstery carrier which serves to receive a seat cushion which defines the aforementioned seat surface and on which a passenger can sit; as well as a coupling member through which the backrest is coupled to the upholstery carrier so that as the backrest folds forwards the upholstery carrier is for example lowered and/or moved in the seat longitudinal direction. By seat longitudinal direction is thereby meant that direction along which the thighs of an occupant extend when the latter is seated in a normal sitting position on the vehicle seat.

By useful position of the backrest are currently meant all those positions of the backrest in which the backrest can be locked and serves to support the back of the seat occupant. This can be a single useful position where the backrest is substantially upright (in the case of a motor vehicle seat with a non-adjustable backrest incline) or a number of different useful positions (in the case of a motor vehicle seat which has an incline-adjustable backrest). In the last mentioned case apart from locking the backrest in a substantially upright useful position there is as a rule the possibility of being able to lock the backrest in different reclining positions so that the seat can also serve as a reclining seat.

If the backrest is folded forwards from these useful positions towards the seat surface then it no longer serves to support the back of a vehicle occupant; rather the use of the corresponding seat by a vehicle occupant in this position of the backrest is not even possible since the backrest covers the seat surface. When the backrest is folded forwards additional space becomes available for transporting objects in the vehicle.

Swivelling or folding the backrest from this useful position forwards onto the seat surface of the vehicle thereby does not necessarily mean that the backrest (with its backrest cushion) has to rest on the seat surface (formed by a seat cushion) of the motor vehicle seat. It is only of importance that the backrest when folded forwards extends above the upholstery carrier (and thereby covers same) so that the desired additional cargo space is provided above the forward-folded backrest. This cargo space is maximised if the backrest in the forward-folded state rests on the seat surface (at least in part); however a considerable additional cargo space can already be provided above the backrest if the backrest when folded forwards is at a distance from the seat surface (formed by the seat cushion) and thus extends at a certain distance above same. The backrest is thereby preferably aligned substantially horizontal and extends substantially parallel or in any case slightly inclined relative to the seat surface.

By coupling the backrest to the upholstery carrier of the vehicle seat through a coupling member when the backrest is folded forwards onto the seat surface the upholstery carrier is shifted vertically down and/or forwards or backwards in the seat longitudinal direction. The additional cargo space which becomes available on folding the backrest forwards can hereby be optimised.

With motor vehicle seats of this kind there is the difficulty that by coupling the backrest to the upholstery carrier a restricted movement of the backrest from a useful position can already lead to a displacement of the upholstery carrier. This is then a drawback by way of example if the backrest is to be adjustable within a useful area by swivelling into different useful positions.

The object of the invention is therefore to provide a motor vehicle seat of the type already mentioned which enables a restricted swivel movement of the backrest without leading to a displacement of the upholstery carrier of the vehicle seat.

BRIEF DESCRIPTION

According to this the coupling member is in active connection with at least one elastic element for example by resilient bearing of the coupling member by the elastic element so that when the backrest is folded forwards (in a first swivel area) first the elastic element becomes deformed before the coupling member (in a subsequent further swivel area of the backrest) can act on the upholstery carrier in order to displace same. I.e. the deformation of the elastic element during the initial swivel movement of the backrest from a useful position has the result that during the swivel movement of the backrest in the first swivel area the coupling member does not act on the upholstery carrier (to displace the upholstery carrier).

This enables a restricted swivel movement of the backrest relative to its at least one useful position without the coupling member becoming active in this first swivel area to displace the upholstery carrier. Rather in a restricted swivel area of the backrest from the at least one useful position or a useful area defined by different useful positions at first only a deformation of the elastic element takes place so that the position of the upholstery carrier is not affected. Only when the deformation of the elastic element has finished, thus the latter has become so deformed that no more deformation is possible through the forces acting when the backrest is folded forwards, does folding the backrest forwards lead to actuation of the coupling member which can then trigger the desired displacement of the upholstery carrier.

For different possibilities for coupling a forward-folding backrest to an upholstery carrier in order to achieve a displacement of the upholstery carrier when folding the backrest forwards reference is made to German Utility Model No. DE 203 03 753 and German Utility Model No. DE 203 04 713. Regarding the additional displacement of the backrest itself during the forward folding movement reference is made to German Utility Model No. DE 102 46 473 in addition to German Utility Model No. DE 203 03 753.

The coupling member is preferably longitudinally extended, e.g. designed in the form of a compression or traction member, more particularly as a flexible traction member (draw cable) which has the elastic element mounted at one end. The longitudinally extended coupling member can thereby be guided at least in some sections in a Bowden sheath.

The elastic element is preferably arranged so that the coupling member is connected through the elastic element to the backrest, more particularly in that the elastic element is supported on the backrest directly or indirectly through a further component part such as e.g. a support element mounted rotatable on the backrest. For this it is proposed that the elastic element is connected at one end to the coupling member and at the other end is supported on the backrest so that when the backrest is folded forwards the elastic element is deformed first before the backrest can act on the upholstery carrier through the coupling member In the case of a coupling member designed as a flexible traction member when the traction member is tightened as the backrest is folded forwards there is an initial deformation of the elastic element. Only when this has been completed can a displacement of the carrier be triggered by tightening the traction member.

The elastic element is preferably here a coil spring, e.g. in the form of a tension or compression spring which surrounds the end section of the coupling member on the backrest side.

The coupling member in turn engages by its end remote from the backrest directly or indirectly through further component parts on the upholstery carrier, namely in particular in the area around the front end in the seat longitudinal direction.

According to a further development of the invention a locking mechanism is provided with which the upholstery carrier can be locked so that it cannot be displaced and which is elastically pretensioned preferably in the direction of the locked state. In order to displace the upholstery carrier as the backrest is folded forwards to the seat surface it is necessary first to release this locking mechanism, namely preferably only after the deformation of the elastic element which serves for the resilient support of the coupling member.

In order to release the locking mechanism it is possible to use a structural assembly such as e.g. a Bowden cable of the longitudinally extended coupling member which is in active connection with the coupling member. When using a flexible traction member as coupling member a corresponding actuation of the Bowden cable when the traction member is tightened as the backrest is folded forwards (after deformation of the elastic element) can be achieved in that movement of the traction member is initially prevented through the locked upholstery carrier. Therefore the tightening of the traction member which happens after deformation of the elastic element at first only leads to a displacement of the Bowden cable which then acts through a corresponding unlocking element on the locking mechanism of the upholstery carrier.

For this it is proposed that the Bowden cable on the one hand is supported on the unlocking element of the locking mechanism and on the other hand on a support of the backrest fixed on the seat frame, namely preferably through rotationally mounted support elements. The rotationally mounted support elements used to support the elastic element and Bowden cable respectively can each have a through opening through which the longitudinally extended coupling member engages.

After the unlocking of the locking mechanism by the Bowden cable the tension member which tightens as the backrest is folded forwards can now move so that it engenders the desired displacement of the upholstery carrier.

In order to permit the displacement of the upholstery carrier as the backrest is folded forwards this can be connected for example through a swivel lever to a floor assembly structure of a motor vehicle. Furthermore the upholstery carrier can be assigned a guiding device in the form of a guiding slide and a guide bolt guided therein by means of which the upholstery carrier is guided as it is displaced.

Locking of the upholstery carrier when the backrest is located in the useful position can be achieved in that a locking element of the locking mechanism, e.g. a swivel mounted locking lever acts on the guide bolt of this guiding device and prevents its movement in the guiding slide. In order to release the locking mechanism this lever has to swivel as the backrest is folded forwards so that it releases the guiding device.

In order to enable the backrest to fold forwards onto the seat surface or the backrest to swivel between different useful positions the latter is mounted preferably to pivot about an axis. This can be on the one hand an axis formed locally fixed on the backrest support or alternatively an axis mounted in a guiding slide and able to move as the backrest is folded forwards. By moving the axis of the backrest during the forward folding movement it is possible to prevent a collision between the backrest and the other structural groups of the corresponding motor vehicle. This can be a rear seat in the case of a corresponding vehicle seat so that for example a collision with the backrest of the vehicle seat in front of same as it folds forwards is avoided.

If the backrest can be brought through swivel action into different useful positions in which it can be locked each time then any known adjusting device can be used here for adjusting the backrest incline. With a self-locking design of this adjusting device it is ensured at the same time that the backrest is locked each time in its relevant useful position. With a non-self-locking design of the adjusting device it is necessary to provide corresponding locking means for this. In each case through the resilient bearing of the coupling member according to the invention it is possible for the backrest to be swivelled into different useful positions within a certain useful area without leading to a displacement of the upholstery carrier.

A design of the vehicle seat of this kind is particularly preferred in the case of a coupling between the backrest and upholstery carrier where as the backrest swivels out from a useful position in order to fold the backrest forwards onto the seat surface, first in a first swivel region a deformation of the elastic element takes place (through tensioning and/or relaxation) without the coupling member acting on the locking mechanism of the upholstery carrier or the upholstery carrier itself in order to induce a release and displacement of the upholstery carrier. This first swivel region (compensation region) thus enables an incline adjustment of the backrest between different useful positions within a useful area in which the adjustment of the backrest results in no action on the upholstery carrier. In a subsequent second swivel area (unlocking region) of the backrest, folding the backrest further forwards then causes the release of the locking mechanism of the upholstery carrier. In a third swivel area which adjoins the aforesaid second swivel area and serves as a displacement area, when the backrest is folded further forwards the upholstery carrier is then moved through the action of the coupling member in the desired way, thus more particularly is lowered and/or moved in the seat longitudinal direction.

BRIEF DESCRIPTION OF THE DRAWINGS

Further features and advantages of the invention will now be apparent from the following description of an embodiment with reference to the drawings.

FIG. 1a is a perspective view of a motor vehicle seat where the backrest is raised up in a useful position;

FIG. 1b is a side view of the motor vehicle seat of FIG. 1a;

FIG. 1c is a section of the motor vehicle seat of FIGS. 1a and 1b in the region of the backrest support;

FIG. 1d is an enlarged view of a support bolt of FIG. 1c;

FIG. 2 is a view of the motor vehicle seat of FIGS. 1a and 1b when the backrest is folded forwards towards the seat surface;

DETAILED DESCRIPTION

Figure 1B:
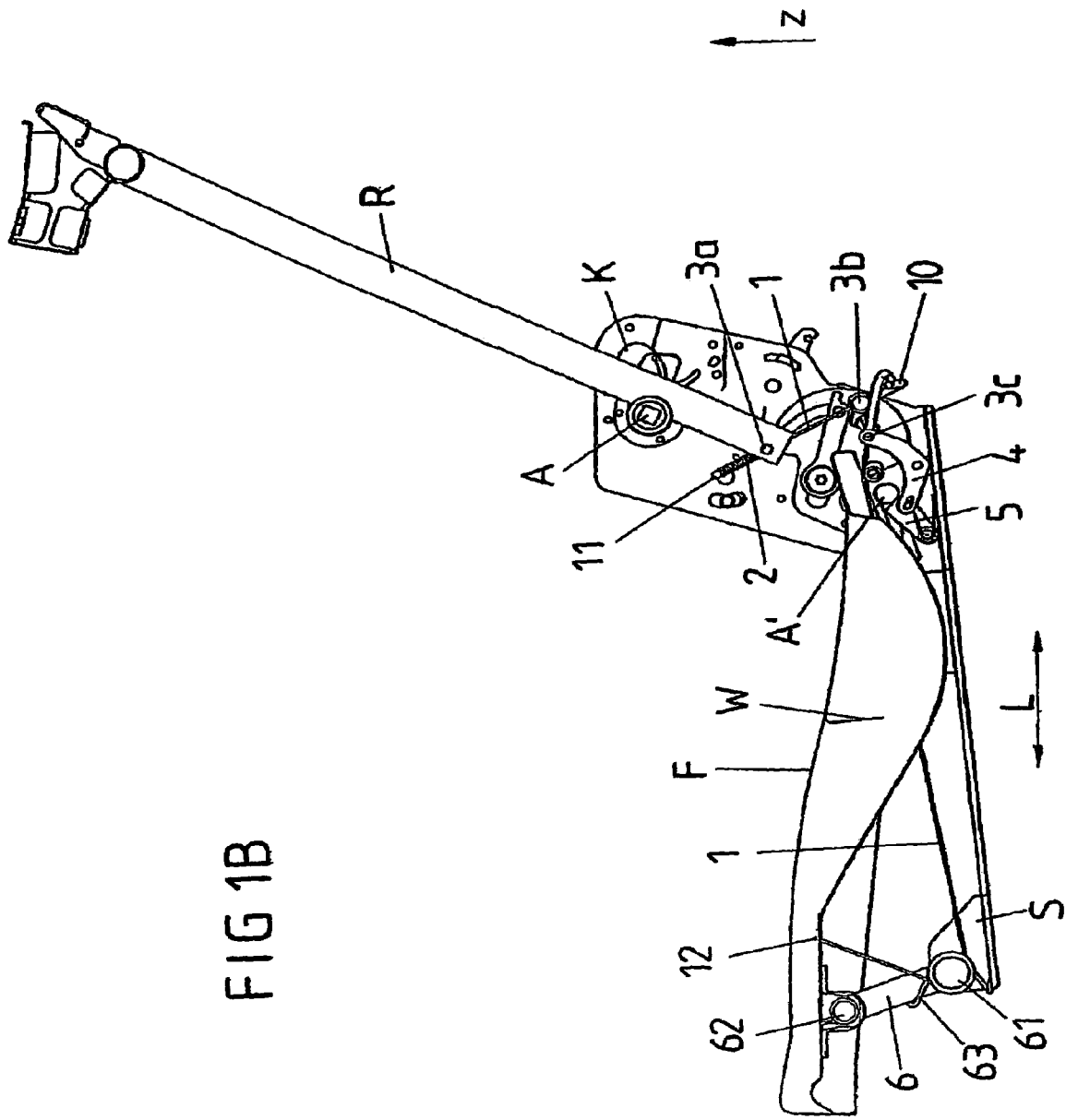

FIGS. 1a and 1b show a motor vehicle seat which has a seat underframe U and a backrest R. The seat underframe U is formed by two seat side parts S mounted on the two longitudinal sides of the motor vehicle seat and extending in the seat longitudinal direction L, with each side part to be fixed to the floor on the vehicle body and on which a seat trough W is mounted where it can swivel. The seat trough W serves as an upholstery carrier to receive a seat cushion and thus defines the seat surface F of the vehicle seat on which a vehicle passenger can be seated. The backrest R is mounted for swivel movement about an axis A on two backrest supports T in the form of backrest fitments which are to be mounted on each longitudinal side of the vehicle seat fixed to the body together with the corresponding seat side part S.

It can be seen from FIGS. 1a and 1b that the swivel axis A defined by a bearing shaft of the backrest R is guided in a sliding guide K so that during swivel movement of the backrest R the swivel axis A can move along the guiding slide K.

It can be seen from the enlarged view of the one part of the vehicle seat shown in FIG. 1c that the seat trough W protrudes in the region of the rear end of the vehicle seat in the seat longitudinal direction L, i.e. that end where the backrest R protrudes from the seat underframe U, is attached for swivel movement to the seat side part S by a swivel axis A'. The swivel axis A' is guided in a sliding guide K' which is formed in the seat side part S and extends in the seat longitudinal direction and is thereby inclined downwards in the forward direction.

In the region of the front end of the seat underframe U in the seat longitudinal direction L, i.e. in the region of the end of the seat underframe U spaced from the backrest R, the seat trough W is connected to the seat side part S by a swivel lever 6. The swivel lever 6 is thereby attached to the seat side part S for swivel movement about a first axis 61 and to the seat trough W for swivel movement about a second axis 62. The swivel lever 6 is pretensioned towards an upright position by a spring 63 so that the seat trough W is lifted in the vertical direction z (substantially perpendicular to the seat surface F).

The backrest R of the vehicle seat illustrated in FIGS. 1a to 1c can be folded forwards towards the seat surface F of the seat underframe U, e.g. to provide additional cargo and stowage space inside the vehicle when the corresponding vehicle seat is not required for a vehicle passenger. When the backrest F is folded forwards accordingly towards the seat surface F the swivel axis A of the backrest R is moved in the associated guiding slide K, namely first backwards in the seat longitudinal direction L whereby as the backrest R folds forward a collision with the structural groups of the vehicle located in front of the corresponding vehicle seat, such as e.g. the dashboard (in the case of a front seat) or with another vehicle seat (in the case of a rear seat) is to be avoided.

It can be seen from FIGS. 1b and 1c that the backrest R is coupled through a traction member 1 in the form of a traction cable of the seat trough W. The traction cable 1 engages by its end section at the backrest side through a coil spring 2 designed as a compression spring (compensation spring) and has at its end a thickened area 11 (in the form of a cable nipple) so that the traction cable 1 is fixed on the coil spring 2 by its end 11 on the backrest side.

The coil spring 2 is supported by its end remote from the end 11 of the traction cable 1 on a support bolt 3a which is mounted for swivel movement on the backrest R (see FIG. 1d) and has a through opening 31 through which the traction cable 11 is passed. The traction cable 1 is thereby under tension when the backrest is located in the useful position so that the coil spring 2 is housed with a slight pretension between the one end 11 of the traction cable 1 and the support bolt 3a of the backrest R.

Behind the backrest R the traction cable 1 is guided in some sections in a Bowden cable 10 which is supported on one side on a support bolt 3b mounted rotatable on the backrest support T, and on the other side on a support bolt 3c mounted rotatable on an unlocking lever 4. The support bolts 3b, 3c likewise have through openings 31 for the traction cable 1 corresponding to the support bolt 3a which is shown in FIG. 1d provided on the backrest R.

The Bowden cable 10 is illustrated in sectional view in FIG. 1c and is correspondingly divided into two sections. In actual fact on each of the two longitudinal sides of the backrest R in the region of the relevant backrest support T, see FIG. 1a, a traction member 1 is fixed through a compression spring 2 which extends from the backrest R to the seat trough W. However the traction members 1 are thereby guided on the relevant opposing longitudinal side of the vehicle seat. I.e. the traction member which on the one longitudinal side of the vehicle seat is fixed on the backrest R is guided to the opposing longitudinal side of the seat trough and vice versa. The traction members 1 thereby cross one another and thus also the associated Bowden cables 10 underneath the seat trough W. I.e. the section of the Bowden cable 1, 10 on the backrest side illustrated in FIG. 1c extends to the opposite backrest support T which is not illustrated in FIG. 1c. However in the following for simplicity the description is continued as if the Bowden cable 1, 10 which can be seen in FIG. 1c runs continuously from the backrest R to the seat trough W.

As can be seen from FIG. 1c in conjunction with FIGS. 1a and 1b the traction cable 1 extends from the unlocking lever 4 along the seat trough W up to the front end, is diverted there by a deflection element 15 and is fixed by its second end 12 in the region of the front end of the seat trough W to the latter.

The unlocking lever 4 which is mounted for swivel movement about an axis 40 formed on the seat side part S and whose one lever arm 41 is fitted with the second support bolt 3c of the Bowden cable 10 has on its second lever arm 42 a sliding guide 44 in which engages a locking pin 51 of a locking lever 5 which is mounted for swivel movement about a swivel axis 50. The locking lever 5 is pretensioned by a torsion spring 55 formed as a leg spring whose one leg is supported on the seat side part S and whose other leg acts on the bolt 51, in the direction of a locking position in which the locking lever 5 prevents movement of the swivel axis A' in the associated slide K' of the seat side part S. The seat trough W is hereby locked by the locking lever 5 since a swivel movement of the seat trough W about its axis A' as a result of the selected geometry and arrangement of the front swivel lever 6 has always to be accompanied by a displacement of the swivel axis A' in the associated guiding slide K'. If a displacement of this kind is prevented by the locking lever 5 then the seat trough W as a whole is locked.

When the backrest R is folded forwards towards the seat surface F the backrest R is first moved from the useful position illustrated in FIGS. 1a to 1c into the vertical position whereby the traction cable 1 and the compensation spring 2 relax slightly. Folding the backrest R further forwards towards the seat surface F, as shown in FIG. 2, causes increased tightening of the traction cable 1 and thus increasing compression and tensioning of the compensation spring 2 since the distance between the end 11 of the traction member 1 on the backrest side and the deflection element 15 on the seat underframe side increases. This tightening of the traction cable 1 is compensated in a first swivel region of the backrest R through an increasing tensioning of the compensation spring 2 until the compensation spring 2 becomes compressed and blocked and cannot be compressed any further.

However also in this state the increasing tightening of the traction cable 1 in a second swivel region of the backrest R still does not lead to a movement of the traction cable 1 itself. For this is prevented in that the seat trough W is locked by the locking lever 5 and cannot therefore be swivelled. The end 12 of the traction cable 1 on the seat trough side is secured locally fixed and despite the increasing tightening of the traction cable 1 during further forward folding of the backrest R can still not carry out any tension movement. Instead it initially leads to a relative movement of the Bowden cable 11 in relation to the traction member 1 against the traction direction whereby the Bowden cable 10 presses against the support bolt 3c mounted on the unlocking lever 4 and thereby swivels the unlocking lever 4 (anti-clockwise). The locking lever 5 is thereby entrained through the guiding slide 44 provided on the unlocking lever 4 and through the bolt 51 provided on the locking lever 5 so that the locking lever 5 is swivelled against the action of the torsion spring 55 (in the clockwise direction) whereby it releases the swivel axis A' in the associated guiding slide K' of the seat side part S. The seat trough W is then no longer locked and the tension force of the traction member during further forward folding of the backrest R in a third swivel region causes the front end of the seat trough W to drop down whereby the corresponding swivel lever 6 is swivelled forwards anti-clockwise. This corresponds to a combined lowering and forward displacement of the seat trough W at the front end whereby the swivel axis A' is likewise moved forwards and downwards in the associated sliding guide K'. The seat is then according to FIG. 3 located in a state where additional stowage and cargo space is provided above the backrest R.

Figure 3:
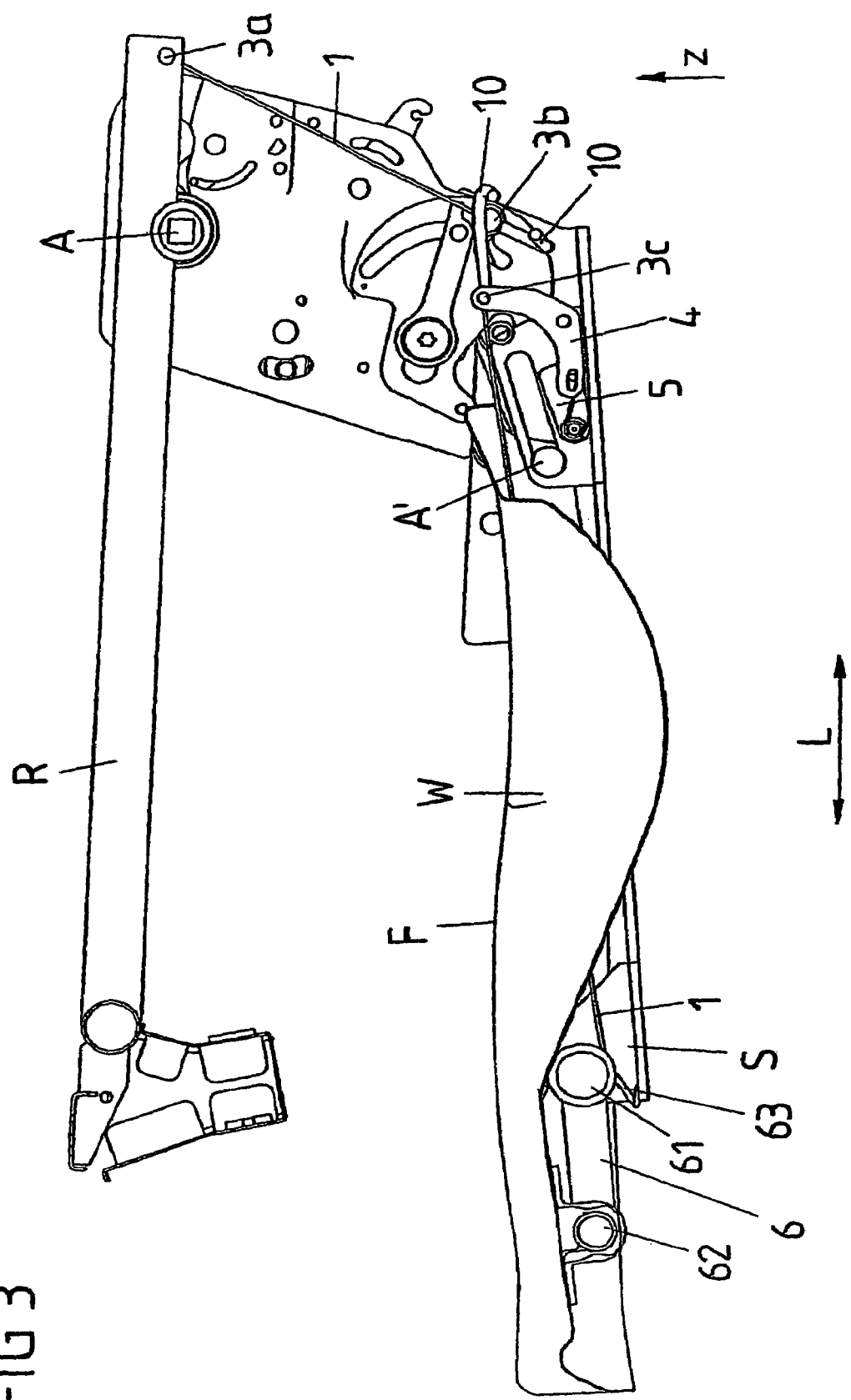
FIG. 3 is a view of the motor vehicle seat of FIGS. 1a and 1b after the seat surface has been folded forwards onto the seat surface.

When the backrest R is swivelled back again from the forward-folded position illustrated in FIG. 3 into the useful position illustrated in FIGS. 1a and 1b the renewed raising and backward displacement of the front end of the seat trough W is assisted through the resetting spring 63 which acts on the swivel lever 6.

When the backrest R has been raised up so far during its return back into the useful position that the traction tension of the traction cable 1 is fully compensated through the compression spring 2 then under the action of the torsion spring 55 the locking lever 5 also moves back into the position in which it blocks the swivel axis A' of the seat trough W again at the rear end of the corresponding guiding slide K', and thus locks the seat trough W. (The return of the swivel axis A' of the seat trough W to the rear end of the guiding slide K' takes place automatically as the backrest R is swivelled back, i.e. raised up as a result of the diminishing traction tension of the traction cable 1 as well as the automatic swivel movement of the swivel lever 6 upwards associated therewith through the action of the resetting spring 63).

As the backrest R swivels back further (roughly from the slightly forwardly inclined position illustrated in FIG. 2 back into the useful position illustrated in FIGS. 1a and 1b) changes in the traction tension of the traction cable 1 are compensated fully by the compensation spring 2 and thus do not act on the unlocking lever 4, the locking lever 5 or the swivel lever 6 of the seat trough W.

The vehicle seat explained above with reference to FIG. 1a to 3 has the important advantage that in a restricted swivel area as the backrest folds forwards from its useful position towards the seat surface a tightening of the traction cable through which the backrest is coupled to the seat trough, is fully compensated through a deformation of a compensation spring. This tightening of the traction cable at first acts neither on the seat trough nor on its locking device (locking lever). Only when the compensation spring is compressed into a block does the traction cable cause the unlocking of the locking lever through the associated Bowden cable and thereby triggers a forward displacement and lowering of the front end of the seat trough.

It is thereby important that the compensation spring 2 can be deformed more easily than the torsion spring 55 with which the locking lever 5 is pretensioned towards the locked state. For this has the result that the tightening of the traction member 1 as the backrest R folds forwards first causes a compression of the compensation spring 2 and only then an unlocking of the locking lever 5 against the action of the torsion spring 55.

The invention claimed is:

1. A motor vehicle seat comprising:
   a backrest that is foldable forwards through swivel action from at least one useful position where the backrest serves to support a back of a seat occupant onto a seat face of the vehicle seat;
   an upholstery carrier to hold a seat cushion which defines a seat surface and on which a seat user sits;
   a coupling member through which the backrest is coupled to the upholstery carrier so that the upholstery carrier is displaced when the backrest is folded forwards;
   wherein the coupling member is connected to an elastic element supported on the backrest so that when the backrest is swivelled from a useful position in a first swivel area the elastic element is deformed before the coupling member acts on the upholstery carrier in at least a further swivel area; and
   wherein the elastic element enables the backrest to be swivelled from the at least one useful position towards the seat surface about a defined swivel angle without the backrest causing a displacement of the upholstery carrier through the coupling member.

2. The motor vehicle seat according to claim 1, wherein the coupling member is longitudinally extended and the elastic element engages on one end of the coupling member.

3. The motor vehicle seat according to claim 1 or 2, wherein the coupling member is a compression or traction member.

4. The motor vehicle seat according to claim 3, wherein the coupling member is a flexible traction cable.

5. The motor vehicle seat according to claim 4, wherein the coupling member is guided at least in some sections in a Bowden cable.

6. The motor vehicle seat according to claim 3, wherein the traction member is tightened as the backrest is folded forwards whereby the elastic element is deformed at first.

7. The motor vehicle seat according to claim 2, wherein the elastic element is a coil spring which encloses an end section of the coupling member.

8. The motor vehicle seat according to claim 2, wherein the coupling member engages by one end on the backrest and by the other end on the upholstery carrier.

9. The motor vehicle seat according to claim 8, wherein the coupling member engages on the upholstery carrier in the region of a front end of the upholstery carrier in a seat longitudinal direction.

10. The motor vehicle seat according to claim 1, wherein the coupling member is connected to the backrest through the elastic element.

11. The motor vehicle seat according to claim 10, wherein the elastic element is supported on the backrest through a support element mounted rotatable on the backrest.

12. The motor vehicle seat according to claim 11, wherein the elastic element is connected at one end of the elastic element to the coupling member and is supported by the other end of the elastic element on the backrest so that when the backrest is folded forwards under the action of the coupling member at first the elastic element is deformed before the coupling member acts on the upholstery carrier to displace same.

13. The motor vehicle seat according to claim 11, wherein the support element has a through opening for the coupling member.

14. The motor vehicle seat according to claim 1, wherein the elastic element is a traction spring or as a compression spring.

15. The motor vehicle seat according to claim 1, wherein a locking mechanism is provided with which the upholstery carrier is lockable so that the upholstery carrier is not shiftable under the action of the coupling member.

16. The motor vehicle seat according to claim 15, wherein the locking mechanism is pretensioned towards the locked state.

17. The motor vehicle seat according to claim 15 or 16, wherein the locking mechanism is unlockable through action of the backrest on the coupling member.

18. The motor vehicle seat according to claim 17, wherein the locking mechanism is releasable after a predeterminable deformation of the elastic element through further action of the backrest on the coupling member when the backrest is folded forwards.

19. The motor vehicle seat according to claim 17, wherein the locking mechanism is releasable through a structural assembly which is in active connection with the coupling member.

20. The motor vehicle seat according to claim 17, wherein after unlocking of the locking mechanism the coupling member is moved as the backrest is folded further forwards so that it causes a displacement of the upholstery carrier.

21. The motor vehicle seat according to claim 15, wherein the coupling member is guided at least in some sections in a Bowden cable and
wherein the locking mechanism is releasable by the Bowden cable in that the Bowden cable is moved when a traction cable is tightened.

22. The motor vehicle seat according to claim 21, wherein the Bowden cable is connected to an unlocking element which is provided to unlock the locking mechanism.

23. The motor vehicle seat according to claim 22, wherein the Bowden cable is supported on a rotatably mounted support element of the unlocking element.

24. The motor vehicle seat according to claim 22, wherein the Bowden cable is supported on a support of the backrest.

25. The motor vehicle seat according to claim 1, wherein the upholstery carrier is connectable through a swivel lever to a structural assembly fixed on the floor of the motor vehicle.

26. The motor vehicle seat according to claim 1, wherein the upholstery carrier is assigned a guiding device by which the upholstery carrier is guided during displacement and that the guiding device is formed by a guiding slide and a bolt guided therein.

27. The motor vehicle seat according to claim 26,
wherein a locking mechanism is provided with which the upholstery carrier is lockable so that the upholstery carrier is not shiftable under the action of the coupling member and wherein the locking mechanism acts in the locked state on the guiding device in order to block displacement of the upholstery carrier.

28. The motor vehicle seat according to claim 27, wherein the locking mechanism acts on the guiding device by a swivel mounted locking lever.

29. The motor vehicle seat according to claim 1, wherein the backrest is mounted for swivel movement about an axis.

30. The motor vehicle seat according to claim 29, wherein the swivel axis is designed as a locally fixed axis.

31. The motor vehicle seat according to claim 29, wherein the swivel axis is designed as an axis which is shiftable when the backrest is folded forwards.

32. The motor vehicle seat according to claim 1, wherein the backrest is assigned an adjusting device by which the backrest is settable in various different useful positions within a useful area through swivel movement.

33. The motor vehicle seat according to claim 32, wherein when the backrest is swivelled within the useful area the elastic element is deformed through tensioning or relaxation so that there is no action by the coupling member on the upholstery carrier.

34. The motor vehicle seat according to claim 1, wherein when the backrest is swivelled forwards out from a useful position
in a first swivel area the elastic element is deformed so that the coupling member cannot act on the upholstery carrier
in a subsequent second swivel area a locking mechanism of the upholstery carrier is released and
in a subsequent third swivel area the coupling member acts on the upholstery carrier so that the upholstery carrier is displaced.

35. The motor vehicle seat according to claim 1, wherein the upholstery carrier is lowered and/or moved in a seat longitudinal direction when the backrest is folded forwards.

36. A motor vehicle seat comprising:
a backrest that is foldable forwards through swivel action from at least one useful position where the backrest serves to support a back of a seat occupant onto a seat face of the vehicle seat;
an upholstery carrier to hold a seat cushion which defines a seat surface and on which a seat user sits;
a coupling member through which the backrest is coupled to the upholstery carrier so that the upholstery carrier is displaced when the backrest is folded forwards;
wherein the coupling member is connected to an elastic element supported on the backrest so that when the backrest is swivelled from a useful position in a first swivel area the elastic element is deformed before the coupling member acts on the upholstery carrier in at least a further swivel area; and
wherein the upholstery carrier comprises a guiding device by which the upholstery carrier is guided during displacement and that the guiding device is formed by a guiding slide and a bolt guided therein.

37. The motor vehicle seat according to claim 36, wherein the elastic element enables the backrest to be swivelled from the at least one useful position towards the seat surface about a defined swivel angle without the backrest causing a displacement of the upholstery carrier through the coupling member.

38. A motor vehicle seat comprising:
a backrest that is foldable forwards through swivel action from at least one useful position where the backrest serves to support a back of a seat occupant onto a seat face of the vehicle seat;
an upholstery carrier to hold a seat cushion which defines a seat surface and on which a seat user sits;
a coupling member through which the backrest is coupled to the upholstery carrier so that the upholstery carrier is displaced when the backrest is folded forwards;

wherein the coupling member is connected to an elastic element supported on the backrest so that when the backrest is swivelled from a useful position in a first swivel area the elastic element is deformed before the coupling member acts on the upholstery carrier in at least a further swivel area;

wherein the backrest is mounted for swivel movement about a swivel axis; and wherein the swivel axis is configured to be shiftable when the backrest is folded forwards.

* * * * *